United States Patent
Kuo et al.

(10) Patent No.: US 9,826,010 B2
(45) Date of Patent: Nov. 21, 2017

(54) WIRELESS NETWORK ACCESS POINT FOR CONTROLLING TRANSMISSION OF DATA STREAM AND METHOD THEREOF

(71) Applicants: AMBIT MICROSYSTEMS (SHANGHAI) LTD., Shanghai (CN); HON HAI PRECISION INDUSTRY CO., LTD., New Taipei (TW)

(72) Inventors: Tien-Ting Kuo, New Taipei (TW); Yuan-Fa Hsieh, New Taipei (TW)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 217 days.

(21) Appl. No.: 14/881,302

(22) Filed: Oct. 13, 2015

(65) Prior Publication Data

US 2017/0048288 A1 Feb. 16, 2017

(30) Foreign Application Priority Data

Aug. 13, 2015 (TW) .............................. 104126446 A

(51) Int. Cl.
*G06F 15/16* (2006.01)
*H04L 29/06* (2006.01)
*H04L 12/26* (2006.01)
*H04W 88/08* (2009.01)

(52) U.S. Cl.
CPC ...... *H04L 65/4069* (2013.01); *H04L 43/0894* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 9,008,599 B2 * | 4/2015 | Park | H04B 1/06 455/154.1 |
| 9,107,081 B1 * | 8/2015 | Pezeshkian | H04W 16/26 |
| 9,473,962 B2 * | 10/2016 | Hsin | H04W 24/06 |
| 2010/0097979 A1 | 4/2010 | Shinozaki | |
| 2011/0113151 A1 | 5/2011 | Nakamura et al. | |

(Continued)

FOREIGN PATENT DOCUMENTS

KR EP 1503544 A2 * 2/2005 ............ H04W 40/00

*Primary Examiner* — Younes Naji
(74) *Attorney, Agent, or Firm* — ScienBiziP, P.C.

(57) ABSTRACT

A wireless network access point implementing a data control system is configured to receive a data stream from a transmitting terminal device and transmit the data stream to a receiving terminal device. The data control system includes a receiving module configured to receive the data stream from the transmitting terminal device, a transmitting module configured to transmit the data stream from the wireless network access point to the receiving terminal device, a speed detecting module configured to detect a current transmission speed of the data stream, a comparing module configured to determine whether the current transmission speed is greater than or equal to a required minimum transmission speed of the data stream, and a managing module configured to stop the wireless network access point from receiving or transmitting the data stream when the current transmission speed is less than the required minimum transmission speed.

18 Claims, 4 Drawing Sheets

(56) References Cited

U.S. PATENT DOCUMENTS

| | | | |
|---|---|---|---|
| 2013/0298208 A1* | 11/2013 | Ayed | G06F 21/00 |
| | | | 726/6 |
| 2014/0140332 A1* | 5/2014 | Jung | H04W 48/20 |
| | | | 370/338 |
| 2014/0287730 A1 | 9/2014 | Masuda et al. | |
| 2015/0071228 A1* | 3/2015 | Quan | H04W 28/02 |
| | | | 370/329 |
| 2015/0110080 A1 | 4/2015 | White et al. | |
| 2015/0215092 A1* | 7/2015 | Lee | H04L 5/0044 |
| | | | 370/336 |
| 2015/0373636 A1* | 12/2015 | Karaca | H04W 48/20 |
| | | | 370/332 |

\* cited by examiner

WIRELESS NETWORK ACCESS POINT FOR CONTROLLING TRANSMISSION OF DATA STREAM AND METHOD THEREOF

FIELD

The subject matter herein generally relates to transmission of data streams, and more particularly to a wireless network access point and a method for controlling transmission of a data stream.

BACKGROUND

Generally, when a data stream is transmitted wirelessly between a transmitting terminal device and a receiving terminal device, a transmission speed of transmitting the data stream between the two terminal devices may be different, which may affect a quality of the data stream.

BRIEF DESCRIPTION OF THE DRAWINGS

Implementations of the present technology will now be described, by way of example only, with reference to the attached figures.

DETAILED DESCRIPTION

Figure 1:
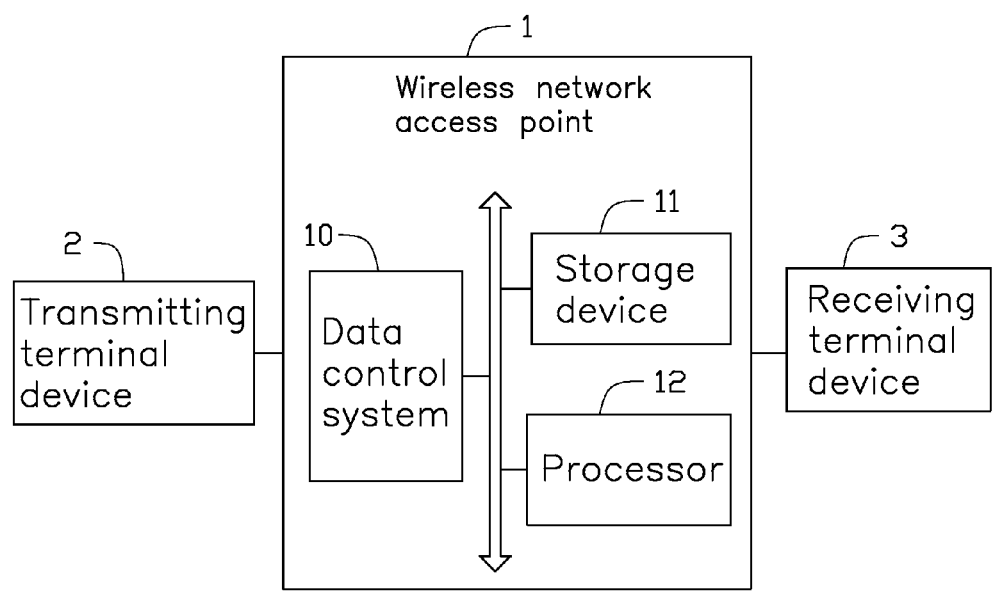
FIG. 1 is a block diagram view of an embodiment of a wireless network access point implementing a data control system, the wireless network access point in wireless communication with a transmitting terminal device and a receiving terminal device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of a wireless network access point 1 implementing a data control system 10. The data control system 10 can receive a data stream from a transmitting terminal device 2 and transmit the data stream to a receiving terminal device 3. The transmitting terminal device 2 and the receiving terminal device 3 can be in wireless communication with the wireless network access point 1. The wireless network access point 1 can be in wireless communication with a plurality of other wireless network access points 1 (not shown). The wireless communication can be WIFI, BLUETOOTH, infrared, or the like. In at least one embodiment, the transmitting terminal device 2 and the receiving terminal device 3 can be a smart phone, a tablet computer, a personal digital assistant, or the like. The wireless network access point 1 can be a wireless router or a wireless switch, for example. The wireless network access point 1 can include a storage device 11 and a processor 12. The storage device 11 can be an internal storage unit of the wireless network access point 1, a secure digital card, a smart media card, an external storage device, or the like.

In at least one embodiment, the data stream is transmitted from the transmitting terminal device 2 to the wireless network access point 1 as a plurality of first data packets, and the data stream is transmitted from the wireless network access point 1 to the receiving terminal device 3 as a plurality of second data packets. The plurality of first data packets can include the data stream transmitted by the transmitting terminal device 2 and corresponding received signal strength indication (RSSI) information of the transmitting terminal device 2. The plurality of second data packets can include the data stream transmitted by the transmitting terminal device 2 and corresponding RSSI information of the receiving terminal device 3. The RSSI information can include a plurality of RSSI values of the transmitting terminal device 2 and the receiving terminal device 3. In at least one embodiment, a normal range of the RSSI values is from −90 decibel-milliwatts (dBm) to −25 dBm.

The storage device 11 can store a reference table of a plurality of transmission parameters of the transmitting terminal device 2 and the receiving terminal device 3. The transmission parameters can include a plurality of reference RSSI values and a corresponding plurality of transmission speeds. Each reference RSSI value in the reference table corresponds to one of the plurality of transmission speeds. The data control system 10 can control transmission of the data stream according to the reference RSSI values and the corresponding transmission speeds.

Figure 2:
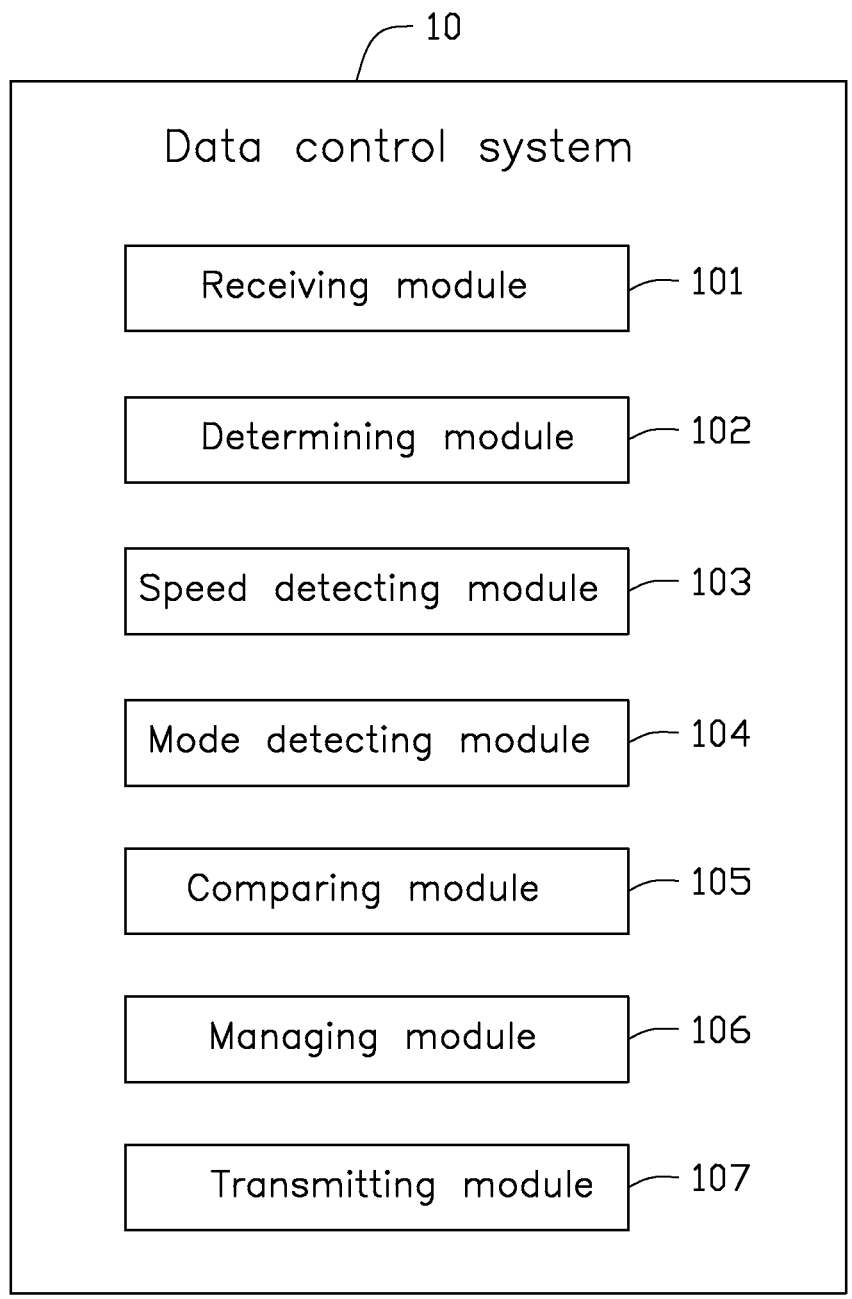
FIG. 2 is a block diagram view of an embodiment of a plurality of modules of the data control system.

As illustrated in FIG. 2, the data control system 10 can include a plurality of modules, such as a receiving module 101, a determining module 102, a speed detection module 103, a mode detecting module 104, a comparing module 105, a managing module 106, and a transmitting module 107. The modules 101-107 can include one or more software programs in the form of computerized codes stored in the storage device 11. The computerized codes can include instructions executed by the processor 12 to provide functions for the modules 101-107.

The receiving module 101 can begin to receive the plurality of first data packets from the transmitting terminal device 2 in real time and complete reception of the plurality of first data packets when a quality of the data stream in the plurality of first data packets is sufficient.

The determining module 102 can determine whether a type of the data stream in the plurality of first data packets and the plurality of second data packets is an audio/video type. In at least one embodiment, the determining module 102 determines whether the data stream is the audio/video type according to a format type of the data stream.

The speed detecting module 103 can detect a required minimum transmission speed of the data stream and a current transmission speed of the data stream. In at least one embodiment, the required minimum transmission speed of the data stream is predetermined according to a media type of the data stream, such as G.729, H.264, MPEG-4, and the like. Because the plurality of first data packets and the plurality of second data packets include the RSSI information of the transmitting terminal device 2 and the receiving terminal device 3, respectively, the speed detecting module 103 can detect the current transmission speed of the data stream by referring to the plurality of reference RSSI values in the reference table.

The mode detecting module 104 can detect a transmission mode of the data stream in the plurality of first data packets and the plurality of second data packets. For example, the transmission mode of the data stream from the transmitting terminal device 2 to the wireless network access point 1 can include a normal transmission mode and a playback transmission mode, and the transmission mode of the data stream from the wireless network access point 1 to the receiving terminal device 3 can include a normal transmission mode and a streaming transmission mode. When the data stream is transmitted to the wireless network access point 1 in the playback transmission mode, the data stream can be saved to the storage device 11 in real time.

The comparing module 105 can determine whether the current transmission speed of the data stream is greater than or equal to the required minimum transmission speed. In at least one embodiment, the comparing module 105 can determine whether the current transmission speed of the data stream is greater than or equal to the required minimum transmission speed when the data stream is transmitted in the normal transmission mode.

The managing module 106 can stop the wireless network access point 1 from receiving or transmitting the data stream when the current transmission speed is less than the required minimum transmission speed and control the wireless network access point 1 to continue receiving or transmitting the data stream when the current transmission speed is greater than or equal to the required minimum transmission speed.

When the managing module 106 stops the wireless network access point 1 from receiving or transmitting the data stream, the managing module 106 can transmit a message to the corresponding transmitting terminal device 2 or the corresponding receiving terminal device 3 to inform a user of the transmitting terminal device 2 or the receiving terminal device 3 that a quality of the data stream is not sufficient and inform the user of ways to improve the transmission speed (i.e., the RSSI value). For example, the managing module 106 can determine which frequency channel that the wireless network access point 1 is connected to and determine a network status of other wireless network access points 1. The message transmitted to the transmitting terminal device 2 or the receiving terminal device 3 can include a recommendation to reduce a distance of the transmitting terminal device 2 or the receiving terminal device 3 from the wireless network access point 1, switch to another wireless network access point 1 on a higher bandwidth channel, switch to another wireless network access point 1 having a better network signal, or the like. For example, the transmission speed can be improved by reducing a distance away from the wireless network access point 1 by five meters, or by switching from a 2.4 G bandwidth channel to a 5 G bandwidth channel when the 5 G bandwidth channel has a fewer number of wireless network access points 1 on it.

When the data stream is transmitted to the wireless network access point 1 in the playback transmission mode, the managing module 106 can save the data stream to the storage device 11 in real time. The managing module 106 can transmit the data stream back to the transmitting terminal device 2 for a user of the transmitting terminal device 2 to determine whether a quality of the data stream that was transmitted to the wireless network access point 1 is sufficient. The managing module 106 can receive user feedback to determine whether the quality of the data stream is sufficient.

When the data stream is transmitted to the receiving terminal device 3 in the streaming transmission mode, the managing module 106 transmits the data stream stored in the storage device 11 to the receiving terminal device 3 for a user of the receiving terminal device 3 to determine whether a quality of the data stream is sufficient.

The transmitting module 107 can begin to transmit the plurality of second data packets to the receiving terminal device 3 and complete transmission of the plurality of second data packets when a quality of the data stream in the plurality of second data packets is sufficient.

Figure 3:
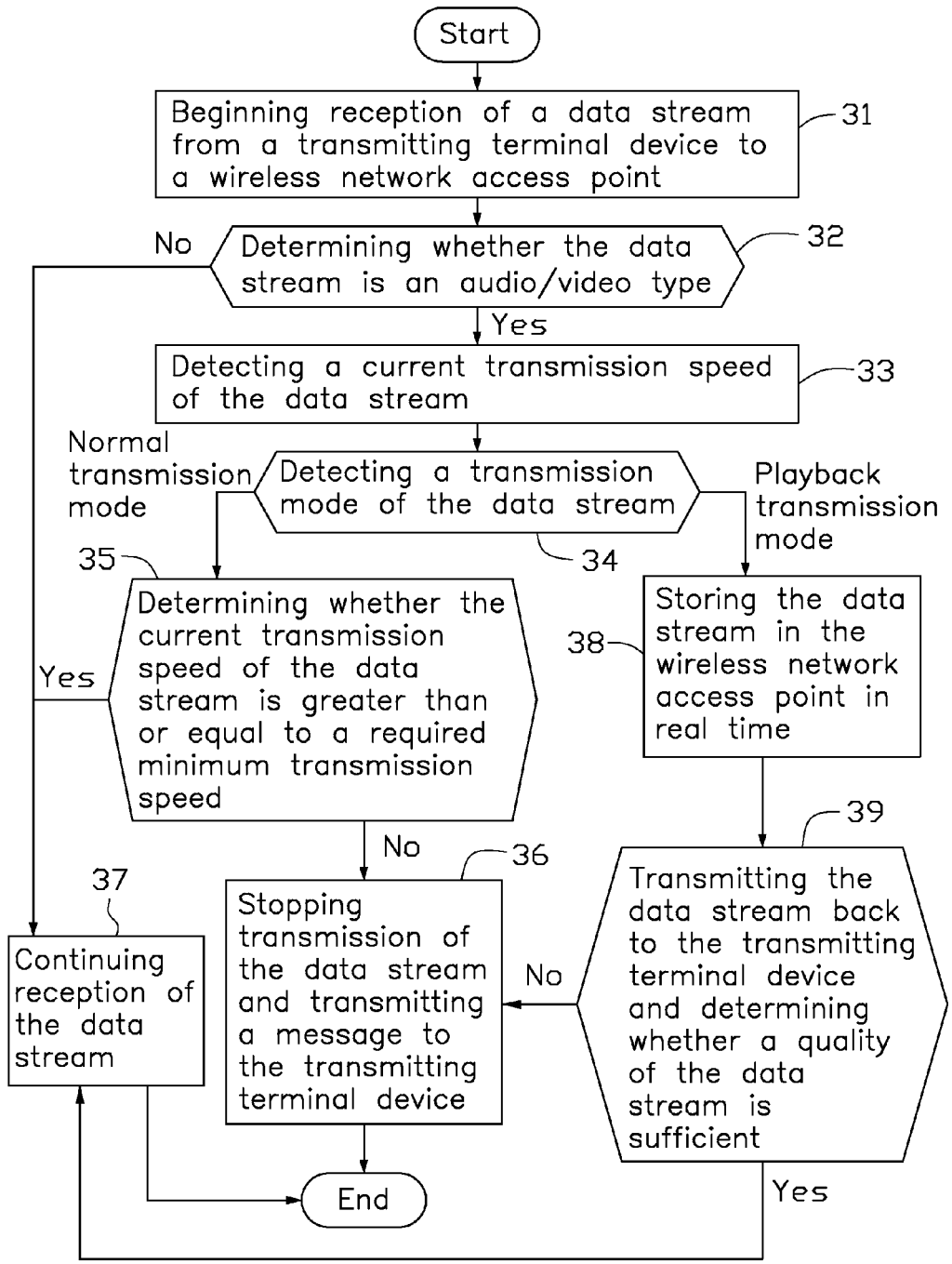
FIG. 3 is a flowchart diagram of an embodiment of a method of the wireless network access point receiving a data stream from the transmitting terminal device

FIG. 3 illustrates a flowchart of a method for a wireless network access point to receive a data stream from a transmitting terminal device. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 31.

At block 31, a transmitting terminal device can begin transmission of a data stream to a wireless network access point. The wireless network access point can be in wireless communication with the transmitting terminal device and with a plurality of other wireless network access points. The data stream can be transmitted as a plurality of first data packets. The plurality of first data packets can include the data stream transmitted by the transmitting terminal device and corresponding received signal strength indication (RSSI) information of the transmitting terminal device. The RSSI information can include a plurality of RSSI values of the transmitting terminal device. In at least one embodiment, a normal range of the RSSI values is from −90 decibel-milliwatts (dBm) to −25 dBm. The wireless network access point can begin to receive the plurality of first data packets from the transmitting terminal device in real time.

At block 32, the wireless network access point can determine whether the data stream in the plurality of first data packets is an audio/video type. In at least one embodiment, the wireless network access point determines whether the data stream is the audio/video type according to a format type of the data stream. When the data stream is the audio/video type, block 33 is implemented. When the data stream is not the audio/video type, block 37 is implemented.

At block 33, the wireless network access point can detect a current transmission speed of the data stream. The wireless network access point can store a reference table of a plurality of transmission parameters of the transmitting terminal device. The transmission parameters can include a plurality of reference RSSI values and a corresponding plurality of transmission speeds. Each reference RSSI value in the reference table corresponds to one of the plurality of transmission speeds. The current transmission speed can be detected by referring to the plurality of reference RSSI values and the corresponding transmission speeds in the reference table.

At block 34, the wireless network access point can detect a transmission mode of the data stream. For example, the transmission mode of the data stream from the transmitting terminal device to the wireless network access point can include a normal transmission mode and a playback transmission mode. When the transmission mode is the normal transmission mode, block 35 is implemented. When the transmission mode is the playback transmission mode, block 38 is implemented.

At block 35, the wireless network access point can determine whether the current transmission speed of the data stream is greater than or equal to a required minimum transmission speed. In at least one embodiment, the required minimum transmission speed is predetermined according to a media type of the data stream. When the current transmission speed is greater than or equal to the required minimum transmission speed, block 37 is implemented. When the current transmission speed is less than the required minimum transmission speed, block 36 is implemented.

At block 36, the wireless network access point can stop transmission of the data stream and transmit a message to the transmitting terminal device. The message can inform a user of the transmitting terminal device that a quality of the data stream is not sufficient and recommend ways to improve the transmission speed (i.e., the RSSI value). For example, the wireless network access point can determine which frequency channel that the wireless network access point is connected to and determine a network status of other wireless network access points. The message transmitted to the transmitting terminal device can include a recommendation to reduce a distance of the transmitting terminal device from the wireless network access point, switch to another wireless network access point on a higher bandwidth channel, switch to another wireless network access point having a better network signal, or the like. For example, the transmission speed can be improved by reducing a distance away from the wireless network access point by five meters, or by switching from a 2.4 G bandwidth channel to a 5 G bandwidth channel when the 5 G bandwidth channel has a fewer number of wireless network access points on it.

At block 37, the wireless network access point can continue receiving the data stream.

At block 38, the wireless network access point can store the data stream in real time.

At block 39, the wireless network access point can transmit the data stream back to the transmitting terminal device for a user to determine whether a quality of the data stream is sufficient. When the quality of the data stream is sufficient, block 37 is implemented. When the quality of the data stream is insufficient, block 36 is implemented.

Figure 4:
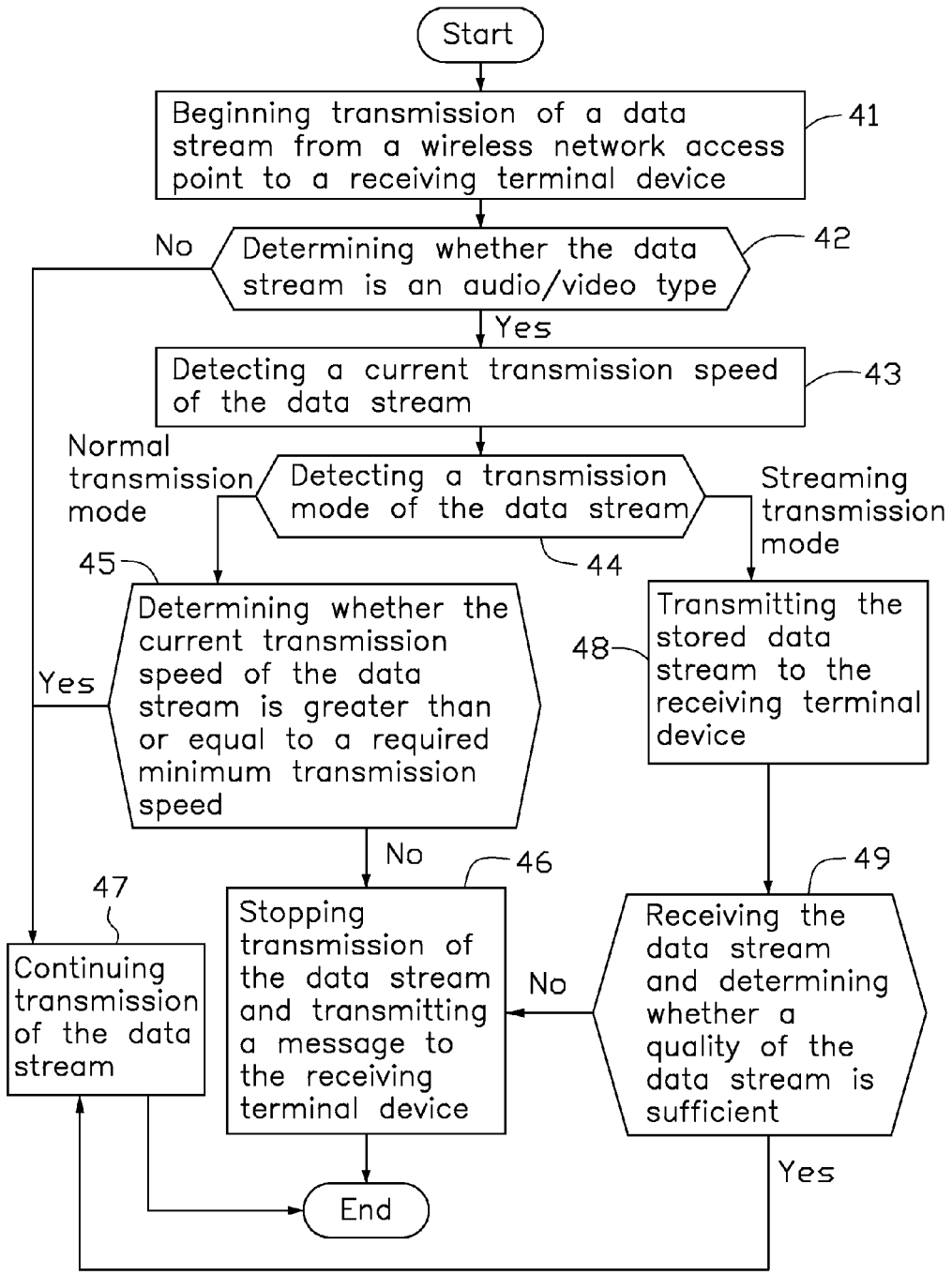
FIG. 4 is a flowchart diagram of an embodiment of a method of the wireless network access point transmitting the data stream to the receiving terminal device.

FIG. 4 illustrates a flowchart of a method for a wireless network access point to transmit a data stream to a receiving terminal device. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 41.

At block 41, a wireless network access point can begin transmission of a data stream to a receiving terminal device. The wireless network access point can be in wireless communication with the receiving terminal device and with a plurality of other wireless network access points. The data stream can be transmitted as a plurality of second data packets. The plurality of second data packets can include the data stream transmitted by the wireless network access point and corresponding received signal strength indication (RSSI) information of the receiving terminal device. The RSSI information can include a plurality of RSSI values of the receiving terminal device. In at least one embodiment, a normal range of the RSSI values is from −90 decibel-milliwatts (dBm) to −25 dBm. The wireless network access point can begin to transmit the plurality of second data packets to the receiving terminal device in real time.

At block 42, the wireless network access point can determine whether the data stream is an audio/video type. In at least one embodiment, the wireless network access point determines whether the data stream is the audio/video type according to a format type of the data stream. When the data stream is the audio/video type, block 43 is implemented. When the data stream is not the audio/video type, block 47 is implemented.

At block 43, the wireless network access point can detect a current transmission speed of the data stream. The wireless network access point can store a reference table of a plurality of transmission parameters of the receiving terminal device. The transmission parameters can include a plurality of reference RSSI values and a corresponding plurality of transmission speeds. Each reference RSSI value in the reference table corresponds to one of the plurality of transmission speeds. The current transmission speed can be detected by referring to the plurality of reference RSSI values and the corresponding transmission speeds in the reference table.

At block 44, the wireless network access point can detect a transmission mode of the data stream. For example, the transmission mode of the data stream from the wireless network access point to the receiving terminal device can include a normal transmission mode and a streaming transmission mode. When the transmission mode is the normal transmission mode, block 45 is implemented. When the transmission mode is the streaming transmission mode, block 48 is implemented.

At block 45, the wireless network access point can determine whether the current transmission speed of the data stream is greater than or equal to a required minimum transmission speed. In at least one embodiment, the required minimum transmission speed is predetermined according to a media type of the data stream. When the current transmission speed is greater than or equal to the required minimum transmission speed, block 37 is implemented. When the current transmission speed is less than the required minimum transmission speed, block 36 is implemented.

At block 46, the wireless network access point can stop transmission of the data stream and transmit a message to the receiving terminal device. The message can inform a user of the receiving terminal device that a quality of the data stream is not sufficient and recommend ways to improve the transmission speed (i.e., the RSSI value). For example, the wireless network access point can determine which frequency channel that the wireless network access point is connected to and determine a network status of other wireless network access points. The message transmitted to the receiving terminal device can include a recommendation to reduce a distance of the receiving terminal device from the wireless network access point, switch to another wireless network access point on a higher bandwidth channel, switch to another wireless network access point having a better network signal, or the like. For example, the transmission speed can be improved by reducing a distance away from the wireless network access point by five meters, or by switching from a 2.4 G bandwidth channel to a 5 G bandwidth channel when the 5 G bandwidth channel has a fewer number of wireless network access points on it.

At block 47, the wireless network access point can continue transmission of the data stream.

At block 48, the wireless network access point can transmit the data stream stored in the wireless network access point to the receiving terminal device.

At block 49, the receiving terminal device can receive the data stream, and a user of the receiving terminal device can determine whether a quality of the data stream is sufficient. When the quality of the data stream is sufficient, block 47 is implemented. When the quality of the data stream is insufficient, block 46 is implemented.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for transmitting a data stream from a transmitting terminal device to a receiving terminal device, the method comprising:
   beginning, by a wireless network access point, reception of a plurality of first data packets from the transmitting terminal device, the plurality of first data packets comprising the data stream and received signal strength indication (RSSI) information of the transmitting terminal device;
   determining, by the wireless network access point according to a type of the data stream, whether the data stream is an audio/video type;
   determining, by the wireless network access point when the data stream is the audio/video type and according to the RSSI information of the transmitting terminal device, whether a first current transmission speed of the data stream is greater than or equal to a predetermined required transmission speed;
   completing, by the wireless network access point when the first current transmission speed of the data stream is greater than or equal to the predetermined required transmission speed, reception of the data stream from the transmitting terminal device;
   beginning, by the wireless network access point, transmission of a plurality of second data packets to the receiving terminal device, the plurality of second data packets comprising the data stream received from the transmitting terminal device and RSSI information of the receiving terminal device;
   determining, by the wireless network access point according to the type of the data stream, whether the data stream is the audio/video type;
   determining, by the wireless network access point when the data stream is the audio/video type and according to the RSSI information of the receiving terminal device, whether a second current transmission speed of the data stream is greater than or equal to the predetermined required transmission speed; and
   completing, by the wireless network access point when the second current transmission speed of the data stream is greater than or equal to the predetermined required transmission speed, transmission of the data stream to the receiving terminal device.

2. The method as in claim 1, wherein when the data stream is of a type other than the audio/video type, the data stream is directly transmitted to the wireless network access point and directly transmitted to the receiving terminal device.

3. The method as in claim 2, wherein the predetermined required transmission speed is predetermined according to a media type of the data stream.

4. The method as in claim 3, wherein:
   the RSSI information of the plurality of first data packets and the plurality of second data packets comprises a plurality of RSSI values;
   the wireless network access point stores a reference table of a plurality of transmission parameters of the transmitting terminal device and the receiving terminal device;
   the plurality of transmission parameters comprises a plurality of reference RSSI values and a corresponding plurality of transmission speeds;
   each reference RSSI value in the reference table corresponds to one of the plurality of transmission speeds;
   the wireless network access point determines the first current transmission speed of the data stream according to the RSSI information of the transmitting terminal device by comparing the plurality of RSSI values of the plurality of first data packets to the plurality of reference RSSI values; and
   the wireless network access point determines the second current transmission speed of the data stream according to the RSSI information of the receiving terminal device by comparing the plurality of RSSI values of the plurality of second data packets to the plurality of reference RSSI values.

5. The method as in claim 4, wherein each of the plurality of transmission speeds in the reference table is an average transmission speed calculated by testing a predetermined number of transmitting terminal devices and a predetermined number of receiving terminal devices that belong to a same predetermined category.

6. The method as in claim 5, wherein:
   a transmission mode of the data stream to the wireless network access point comprises a normal transmission mode and a playback transmission mode;

the wireless network access point determines whether the first current transmission speed of the data stream is greater than or equal to the predetermined required transmission speed when the data stream is transmitted to the wireless network access point in the normal transmission mode; and when the data stream is transmitted to the wireless network access point in the playback transmission mode, the wireless network access point stores the data stream in real time upon receiving the data stream, and transmits the data stream back to the transmitting terminal device for a user of the transmitting terminal device to determine whether a quality of the data stream that was transmitted to the wireless network access point is sufficient.

7. The method as in claim 6, wherein:
when the first current transmission speed of the data stream to the wireless network access point is smaller than the predetermined required transmission speed or when the quality of the data stream that was transmitted to the wireless network access point is insufficient, the wireless network access point stops receiving the data stream from the transmitting terminal device and sends a message to the transmitting terminal device to inform that the quality of the data stream is not sufficient.

8. The method as in claim 5, wherein:
a transmission mode of the data stream to the receiving terminal device comprises a
normal transmission mode and a streaming transmission mode;
the wireless network access point determines whether the second current transmission speed of the data stream is greater than or equal to the predetermined required transmission speed when the data stream is transmitted to the receiving terminal device in the normal transmission mode; and
when the data stream is transmitted to the receiving terminal device in the streaming transmission mode, the data stream stored in the wireless network access point is transmitted to the receiving terminal device for a user of the receiving terminal device to determine whether a quality of the data stream that is transmitted to the receiving terminal device is sufficient.

9. The method as in claim 8, wherein:
when the second current transmission speed of the data stream to the receiving terminal device is smaller than the predetermined required transmission speed or when the quality of the data stream that is transmitted to the receiving terminal device is insufficient, the wireless network access point stops transmitting the data stream to the receiving terminal device and sends a message to the receiving terminal device to inform that the quality of the data stream is not sufficient.

10. The method as in claim 1, wherein the wireless network access point is in wireless communication with a plurality of wireless network access points.

11. A wireless network access point comprising:
a memory;
a processor coupled to the memory, wherein the processor is configured to:
begin reception of a plurality of first data packets from a transmitting terminal device, the plurality of first data packets comprising a data stream and received signal strength indication (RSSI) information of the transmitting terminal device;
determine, according to a type of the data stream, whether the data stream is an audio/video type;
determine, when the data stream is the audio/video type and according to the RSSI information of the transmitting terminal device, whether a first current transmission speed of the data stream is greater than or equal to a predetermined required transmission speed;
complete, when the first current transmission speed of the data stream is greater than or equal to the predetermined required transmission speed, reception of the data stream from the transmitting terminal device;
begin transmission of a plurality of second data packets to a receiving terminal device, the plurality of second data packets comprising the data stream received from the transmitting terminal device and RSSI information of the receiving terminal device;
determine, according to the type of the data stream, whether the data stream is the audio/video type;
determining, when the data stream is the audio/video type and according to the RSSI information of the receiving terminal device, whether a second current transmission speed of the data stream is greater than or equal to the predetermined required transmission speed; and
complete, when the second current transmission speed of the data stream is greater than or equal to the predetermined required transmission speed, transmission of the data stream to the receiving terminal device.

12. The wireless network access point as in claim 11, wherein:
the memory stores a reference table of a plurality of transmission parameters;
the RSSI information of the plurality of first data packets and the plurality of second data packets comprises a plurality of RSSI values;
the plurality of transmission parameters stored in the reference table comprises a plurality of reference RSSI values and a corresponding plurality of transmission speeds; each reference RSSI value in the reference table corresponds to one of the plurality of transmission speeds; and
the processor is further configured to
detect the first current transmission speed of the data stream according to the RSSI information of the transmitting terminal device by comparing the plurality of RSSI values of the plurality of first data packets to the plurality of reference RSSI values and detect the second current transmission speed of the data stream according to the RSSI information of the receiving terminal device by comparing the plurality of RSSI values of the plurality of second data packets to the plurality of reference RSSI values.

13. The wireless network access point as in claim 12, wherein the predetermined required transmission speed is predetermined according to a media type of the data stream; and each of the plurality of transmission speeds in the reference table is an average transmission speed calculated by testing a predetermined number of transmitting terminal devices and a predetermined number of receiving terminal devices that belong to a same predetermined category.

14. The wireless network access point as in claim 13, wherein the processor is further configured to:
when the type of the data stream is not the audio/video type, control the wireless network access point to continue receiving and transmitting the data stream.

15. The wireless network access point as in claim 14, wherein the processor is further configured to:
- detect a first transmission mode of the data stream transmitted from the transmitting terminal device to the wireless network access point, wherein the first transmission mode of the data stream transmitted from the transmitting terminal device to the wireless network access point comprises a first normal transmission mode and a playback transmission mode;
- determine whether the first current transmission speed of the data stream is greater than or equal to the predetermined required transmission speed when the data stream is transmitted to the wireless network access point in the first normal transmission mode;
- when the data stream is transmitted to the wireless network access point in the playback transmission mode, store the data stream to the memory in real time upon receiving the data stream, and transmit the data stream back to the transmitting terminal device for a user of the transmitting terminal device to determine whether a quality of the data stream that was transmitted to the wireless network access point is sufficient;
- detect a second transmission mode of the data stream from the wireless network access point to the receiving terminal device, wherein the second transmission mode of the data stream transmitted from the wireless network access point to the receiving terminal device comprises a second normal transmission mode and a streaming transmission mode;
- determine whether the second current transmission speed of the data stream is greater than or equal to the predetermined required transmission speed when the data stream is transmitted to the receiving terminal device in the second normal transmission mode;
- when the data stream is transmitted to the receiving terminal device in the streaming transmission mode, transmit the data stream stored in the memory to the receiving terminal device for a user of the receiving terminal device to determine whether a quality of the data stream that is transmitted to the receiving terminal device is sufficient.

16. The wireless network access point as in claim 15, wherein the processor is further configured to:
- when the first current transmission speed of the data stream to the wireless network access point is smaller than the predetermined required transmission speed or when the quality of the data stream that was transmitted to the wireless network access point is insufficient, stop the wireless network access point from receiving the data stream from the transmitting terminal device and send a message to the transmitting terminal device to inform that the quality of the data stream that was transmitted to the wireless network access point is not sufficient and to recommend ways of improving the first current transmission speed of the data stream.

17. The wireless network access point as in claim 15, wherein the processor is further configured to:
- when the second current transmission speed of the data stream to the receiving terminal
- device is smaller than the predetermined required transmission speed or when the quality of the data stream that is transmitted to the receiving terminal device is insufficient, stop the wireless network access point from transmitting the data stream to the receiving terminal device and send a message to the receiving terminal device to inform that the quality of the data stream that is transmitted to the receiving terminal device is not sufficient and to recommend ways of improving the second current transmission speed of the data stream.

18. The wireless network access point as in claim 11, wherein the wireless network access point is in wireless communication with a plurality of wireless network access points.

* * * * *